(12) United States Patent
Hatt

(10) Patent No.: US 10,987,843 B2
(45) Date of Patent: Apr. 27, 2021

(54) PRESSURE SENSOR FOR A METAL OR PLASTICS PROCESSING TOOL

(71) Applicant: KISTLER HOLDING AG, Winterthur (CH)

(72) Inventor: Tanja Hatt, Winterthur (CH)

(73) Assignee: Kistler Holding AG, Winterthur (CH)

( * ) Notice: Subject to any disclaimer, the term of this patent is extended or adjusted under 35 U.S.C. 154(b) by 157 days.

(21) Appl. No.: 16/161,191

(22) Filed: Oct. 16, 2018

(65) Prior Publication Data

US 2019/0111604 A1 Apr. 18, 2019

(30) Foreign Application Priority Data

Oct. 16, 2017 (EP) .................................... 17196594

(51) Int. Cl.
| | | |
|---|---|---|
| *B29C 45/77* | (2006.01) | |
| *B29C 45/37* | (2006.01) | |
| *G01L 9/00* | (2006.01) | |
| *B22D 17/32* | (2006.01) | |
| *G01L 19/14* | (2006.01) | |

(52) U.S. Cl.
CPC .............. *B29C 45/77* (2013.01); *B22D 17/32* (2013.01); *B29C 45/374* (2013.01); *G01L 9/0002* (2013.01); *G01L 9/0004* (2013.01); *G01L 9/0005* (2013.01); *G01L 19/143* (2013.01); *B29C 2945/76006* (2013.01); *B29C 2945/76254* (2013.01); *B29C 2945/76498* (2013.01)

(58) Field of Classification Search
CPC ........... B29C 2945/76006; B29C 2945/76254; B29C 2945/76498
See application file for complete search history.

(56) References Cited

U.S. PATENT DOCUMENTS 3,672,223 A * 6/1972 Spescha .................. G01L 9/008
                                                             73/723
4,059,999 A 11/1977 Engeler et al.
(Continued)

FOREIGN PATENT DOCUMENTS

| CH | 573592 | 3/1976 |
|---|---|---|
| CN | 1204559 A | 1/1999 |
| DE | 102009027108 | 11/2010 |

OTHER PUBLICATIONS

Japanese Office Action and English Translation thereof, Japanese Patent Application No. 2018-194102, dated Jul. 30, 2019, 4 pages.
(Continued)

*Primary Examiner* — Jacob T Minskey
*Assistant Examiner* — Baileigh Kate Darnell
(74) *Attorney, Agent, or Firm* — Dority & Manning, P.A.

(57) ABSTRACT

A space-saving pressure sensor for a metal or plastics processing tool is configured to perform date stamping during injection molding with the processing tool. The pressure sensor is configured to be inserted into a single drilled hole of the tool. A first cast-compatible mark and a second cast-compatible mark of the pressure sensor may be adjusted against one another in such a way that a variety of different date marks can be created, which may then be applied to different injection-molded products. The pressure sensor may be used within the framework of manufacturing an injection-molded product.

15 Claims, 2 Drawing Sheets

(56) References Cited

U.S. PATENT DOCUMENTS

| | | | | |
|---|---|---|---|---|
| 5,788,872 | A * | 8/1998 | Uratani | B29C 33/428 249/103 |
| 5,887,638 | A * | 3/1999 | Yoritsune | B22C 9/02 164/4.1 |
| 5,902,512 | A * | 5/1999 | Streit | B29C 33/428 249/103 |
| 6,923,068 | B2 * | 8/2005 | Barron | G01L 9/0052 257/419 |
| 6,966,257 | B2 * | 11/2005 | Uratani | B29C 33/428 101/4 |
| 7,171,857 | B2 * | 2/2007 | Barron | G01L 9/0052 257/419 |
| 7,171,894 | B2 * | 2/2007 | Uratani | B29C 33/424 101/4 |
| 7,430,923 | B2 * | 10/2008 | Bader | B29C 45/77 73/856 |
| 7,503,542 | B2 * | 3/2009 | Uratani | B29C 45/345 101/4 |
| 8,011,638 | B2 * | 9/2011 | Uratani | B29C 45/374 249/103 |
| 8,057,211 | B2 * | 11/2011 | Zhou | B44B 5/00 425/183 |
| 9,074,952 | B2 * | 7/2015 | Pletscher | G01L 23/10 |
| 2007/0277618 | A1 * | 12/2007 | Kroeger | G01L 9/008 73/723 |
| 2012/0125212 | A1 | 5/2012 | Opitz | |
| 2012/0266683 | A1 | 10/2012 | Pletscher | |

OTHER PUBLICATIONS

Jung-Tang Huang, Study of Injection Molding Pressure Sensor with Low Cost and Small Probe, journal. vol. 101—Issue 3, Amsterdam, Oct. 30, 2002, A1-A2, 255-402.

Cavity Pressure Sensor, Kistler Group, 2013 . . . 2015, pp. 1-5.

Extended European Search Report (71796594.0), dated Apr. 27, 2018.

Chinese Office Action and Translation, dated Apr. 26, 2020 20 pages.

* cited by examiner

PRESSURE SENSOR FOR A METAL OR PLASTICS PROCESSING TOOL

FIELD OF THE INVENTION

The invention refers to a pressure sensor for a metal or plastics processing tool and use of the pressure sensor. The invention further refers to a metal or plastics processing tool. Further, the invention refers to a method for retrofitting a metal or plastics processing tool.

BACKGROUND OF THE INVENTION

Pressure sensors are known and are used in many ways. One field of application for pressure sensors refers to metal and plastics processing. Thus, pressure sensors are used in metal and plastics processing tools in order to, for example, be able to measure the pressure in the space enclosed by the tool during injection molding. The measured pressure is used in order to control and optimize the injection molding process. Thus, the quality of the injection-molded products produced this way is improved. For example, a suitable pressure sensor is known from U.S. Pat. No. 4,059,999, which is hereby incorporated herein for all purposes by this reference. This is a pressure sensor with a cylindrical measuring element located directly behind a pressure piston. The measuring element may be passive or active and operate according to a piezoelectric, piezoresistive, inductive or capacitive measuring method. The pressure sensor is inserted into a drilled hole of the tool and a housing body of the pressure sensor is pressed longitudinally on a contact surface of the tool using mounting bolts. The pressure to be measured within the space of the tool affects the pressure piston and is captured by the measuring element as a force. Such pressure sensors comprised by the state of the art are hereinafter referred to as conventional pressure sensors.

Likewise, date stamps, also referred to as identification stamps, are known in metal and plastics processing. They can be used to attach a date stamp to the injection-molded product during injection molding. This way, injection-molded products can be traced, for instance by enabling conclusions to a certain batch. For many plastics products such as parts requiring documentation and safety parts, installing a date stamp is mandatory. For example, such a date stamp is disclosed in US Patent Application Publication No. 2012-125212A1, which is hereby incorporated herein for all purposes by this reference. An outer bushing has marks on its front face such as the numbers of the twelve months. A pivotable actuator surrounded by the bushing also has marks, for example an arrow and the year. By rotating the actuator in relation to the bushing, any date stamps can be created this way. Date stamps are normally also attached in a drilled hole located within the tool. Such date stamps comprised by the state of the art are hereinafter referred to as conventional date stamps.

Frequently, the installation space for pressure sensors and date stamps within the metal and plastics processing tool is limited in such a way that either a pressure sensor or a date stamp can be installed, but not both together. If, as a consequence, it is not possible to install a pressure sensor, this may compromise the quality of the injection-molded product. If it is not possible to install a date stamp, no parts requiring documentation or safety parts may be produced.

BRIEF DESCRIPTION OF THE INVENTION

Thus, the task of the invention is to provide suitable devices and methods enabling both pressure measurement and date stamping even in small tools or in tools with limited installation space in a manner that is as space-saving and advantageous as possible.

The solution of the task is explained hereinafter. According to one embodiment of the invention, a pressure sensor for a metal or plastics processing tool comprises a sensor housing that can be connected to the tool. Further, the pressure sensor comprises a pressure transducer located in the sensor housing. Further, the pressure sensor has a first front face with a first cast-compatible mark. Additionally, the pressure sensor has a second front face with a second cast-compatible mark. The first front face and the second front face are adjustable against one another.

The pressure sensor according to the invention is space-saving, because it can be installed in only one single recess or drilled hole within the metal or plastics processing tool. Further, installing the pressure sensors according to the invention into a tool saves time, saves money and is easier, because only a single drilled hole must be created within the tool. A pressure sensor according to the invention is also suitable for retrofitting of tools up to now only containing a conventional pressure sensor or a conventional date stamp, i.e. the tools already have a drilled hole that can now be used to insert the pressure sensor according to the invention enabling both pressure measurement and date stamping. Further, inventory holding is facilitated, because only a single part, namely the pressure sensor according to the invention, must be kept in store and no longer two different parts, namely a conventional pressure sensor and a date stamp.

The solution according to the invention is a completely new approach, because the solution is not based on the pressure sensor being downsized by a pressure sensor manufacturer and/or the date stamp being downsized by a date stamp manufacturer, but on integrating a date stamp in a pressure sensor.

A metal or plastics processing tool specifically is a mold that can be used in order to produce an injection-molded product.

The sensor housing encloses at least the conventional part of the pressure sensor according to the invention. The conventional part of the pressure sensor according to the invention refers to pressure measurement. The sensor housing of a conventional pressure sensor has a measuring surface. During operation of the pressure sensor according to the invention, this measuring surface of the conventional pressure sensor is exposed to the pressure to be measured "directly" or "indirectly". The pressure to be measured "directly" or "indirectly" affects the measuring surface. As used in this context, the term "direct" means that the measuring surface of a conventional pressure sensor makes contact with the medium, the pressure of which is to be measured. The term "indirect" means that there is a pressure-transmitting element between the measuring surface of a conventional pressure sensor and the medium, the pressure of which is to be measured, the element coming into contact with both the medium and the measuring surface of the conventional pressure sensor such that the measuring surface of the conventional pressure sensor in this "indirect" case does not come into contact with the medium, the pressure of which is to be measured.

Any commercially available conventional pressure transducer may be used as a pressure transducer such as a piezoelectric, piezoresistive, inductive, capacitive and/or potentiometric pressure transducer, and/or a pressure transducer with resistive wire strain. The pressure transducer captures the pressure affecting the measuring surface as a force.

The pressure sensor according to the invention, which may consist of an integration of a date stamp within a conventional pressure sensor, makes contact with the medium, the pressure of which is to be measured. This contact area is referred to as front face. The front face is divided into different areas, i.e. at least into a first front face and a second front face. It is possible that the first front face and the second front face together make up the entire front face of the pressure sensor according to the invention: this bears the advantage that the entire front face is available for representable marks. However, it is also possible that the first front face and the second front face together make up less than the entire front face. This may be the case if the measuring surface of the sensor housing, as mentioned above, directly comes into contact with the medium, the pressure of which is to be measured, and if this measuring surface is not identical with the first front face or the second front face, i.e. if the measuring surface does not have any cast-compatible mark. Further, it is possible to provide one or more additional front faces with one or more additional cast-compatible marks, with the one or more additional front faces being adjustable against one another and/or against the first front face and/or against the second front face.

The first cast-compatible mark and the second cast-compatible mark advantageously comprise one or more alphanumeric characters and/or one or more indicators such as one or more arrows. The cast-compatible marks may be formed by indentations and/or elevations versus a base area. The cast-compatible marks may seem mirror-inverted when looking at the front face of the pressure sensor according to the invention.

As a result of the first front face and the second front face being adjustable against one another, the first cast-compatible mark and the second cast-compatible mark may adopt a variety of different positions regarding one another. Every position of the first cast-compatible mark in relation to the position of the second cast-compatible mark causes a certain cast-compatible overall mark differing from the other cast-compatible overall marks for different positions. Thus, one and the same pressure sensor according to the invention may be used to create a variety of different cast-compatible overall marks by adjusting the first front face regarding the second front face, with the marks resulting in different representations on the injection-molded products. The meaning of the different representations that can be created by using the different cast-compatible overall marks may be a date and/or a batch number, for example.

The first front face and the second front face may be adjustable against one another such that specified positions are adapted preferably. This may be achieved by snap-in elements arranged in a suitable manner.

Adjustment may be manual, for example using an adjustment tool engaging an indentation of a cast-compatible mark and thereby allowing for applying a force to the related front face, which in turn results in an adjustment of the corresponding front face. The direction of the force for adjusting a front face may be in a plane parallel to the front face. Adjustment may also be performed by applying a torque around the longitudinal axis of the pressure sensor according to the invention, whereby the front face will rotate around said longitudinal axis.

In a preferred embodiment, the first front face is connected operatively to the pressure transducer.

The advantage of this embodiment is that the pressure applied to the first front face is transferred to the measuring surface of the sensor housing the pressure transducer is located in. Thus, during operation of the pressure sensor, the first front face serves both for applying a representation to the injection-molded product and for capturing the pressure during injection molding due to the first cast-compatible mark contained thereon.

A particularly simple design of the pressure sensor can be achieved if the first front face forms the measuring surface, i.e. if the first cast-compatible mark is located directly on the measuring surface of the sensor housing.

However, it is also possible for there being a pressure-transmitting element between the first front face and the measuring surface. This pressure-transmitting element may have additional features, as will be explained below.

If the first front face does not form the measuring surface, the first front face and the measuring surface are arranged behind one another, i.e. that, when looking from the medium, the pressure of which is to be measured, the first front face comes first, followed by the measuring surface.

In the event of a very small measuring surface, it may also be advantageous for it to directly come into contact with the medium, the pressure of which is to be measured, without a first cast-compatible mark or a second cast-compatible mark being located thereon, i.e. that neither the first front face nor the second front face must be operatively connected to the pressure transducer mandatorily.

In another preferred embodiment, the first front face is entirely enclosed by the second front face.

This embodiment is specifically advantageous if, for example, the first front face has an indicator or arrow as first cast-compatible mark pointing, depending on the position of the first front face in relation to the second front face, to a certain part of the second cast-compatible mark.

The first front face may be circular. The second front face may have a circular hole the first front face is located in. The first front face may completely fill the hole of the second front face.

The first front face may also be shaped like a polygon such as a tetragon, hexagon or dodecagon. The second front face may have a corresponding hole so that the first front face in turn completely fills the hole of the second front face.

However, it is absolutely possible that the second front face only surrounds the first front face partially or is surrounded by the first front face.

In another preferred embodiment, the first front face and the second front face are substantially in a common plane.

This way, the application of the first cast-compatible mark and the second cast-compatible mark on the injection-molded part during injection molding is as level as possible. The injection-molded part being unnecessarily thick is avoided.

However, it is also possible that the first front face and the second front face are located in two parallel, but spaced apart planes. In this case, the first front face may project, for example, and on its lateral surrounding wall there may be a protrusion pointing to a part of the second cast-compatible mark, with the protrusion possibly overlapping the second front face.

If the first front face and the second front face are located in a common plane, the first front face and the second front face may be free of overlaps.

In another preferred embodiment, the second front face with the second cast-compatible mark is arranged on a bushing.

The bushing is particularly tubular and has an inner diameter that is equal to or larger than the outer diameter of the sensor housing in the area of the measuring surface. As a consequence, the bushing allows for using existing conventional pressure sensors, the sensor housing of which may be used to apply the bushing with the second cast-compatible mark from the measuring surface. In this, it is sufficient that the bushing is arranged on the sensor housing in certain areas.

A polygon-shaped hollow profile may be used as a bushing, for example a square, hexagonal or dodecagon hollow profile. A polygon-shaped hollow profile is intended to be a body with a longitudinal extension that is hollow on the inside and that, regarding its cross-section, has a polygon as inner and outer limiting line orthogonal to its longitudinal axis.

When compared to a (round) bushing, a polygon-shaped hollow profile as the advantage that predetermined positions between the second cast-compatible mark versus the first cast-compatible mark that may be located within or outside of the polygon-shaped hollow profile are possible.

In another preferred embodiment, the bushing is in contact with the sensor housing.

In this, the bushing and the sensor housing are arranged concentrically. Thus, a specifically space-saving construction of the pressure sensor according to the invention can be achieved.

Alternatively, there may be a distance between the bushing with the second cast-compatible mark and the sensor housing. This distance provides space for an additional bushing that has the first cast-compatible mark, for example. Such bushings may be readily adjusted against one another by rotating them.

In another preferred embodiment, the bushing is fixedly connected to the sensor housing.

This embodiment may be produced particularly easily.

The bushing may be fixedly connected to the sensor housing applying any known manner such as by forcing it on, by screwing it on, by soldering, by welding and/or by gluing.

However, as already mentioned above, it is not mandatory to fixedly connect the bushing to the sensor housing. The bushing may also make contact to the sensor housing whilst still being able to be moved or may even be located at a distance.

In another preferred embodiment, the first front face is arranged on an adjustment element such that the first front face can be rotated in relation to the sensor housing.

In this, the adjustment element may be designed in the form of a pressure-transmitting element that is in contact with the measuring surface of the sensor housing. However, the adjustment element may also be designed as a bushing or polygon-shaped hollow profile enclosing the second front face.

In another preferred embodiment, the bushing is fixedly connected to the sensor housing and the first front face is arranged on an adjustment element such that the first front face can be rotated in relation to the sensor housing.

This way, the adjustment of the front faces against one another may be implemented particularly easily and existing conventional pressure sensors may be used without conversions.

In another preferred embodiment, the bushing surrounds the adjustment element.

This embodiment is particularly space-saving.

In another preferred embodiment, the first front face is fixedly connected to the sensor housing.

This embodiment can also be produced easily.

The invention further refers to a metal or plastics processing tool. A pressure sensor according to the invention is arranged on the tool.

Such a tool may be used in order to produce injection-molded products having a good quality and, for example, a date stamp, even if the installation space within the tool is not sufficient in order to install a conventional pressure sensor and a conventional date stamp within the tool.

The pressure sensor according to the invention may be inserted into a recess and particularly into a drilled hole located within the tool. The pressure sensor according to the invention may be fixedly or adjustably connected to the tool. The pressure sensor may be connected to the tool in a positive-locking and/or friction-locked manner. This way, the pressure sensor may be connected to the tool via longitudinal stop or a screwed connection.

In another preferred embodiment, the sensor housing installed into the tool can be adjusted, particularly rotated, in relation to the tool.

Thereby, a particularly simple construction of the tool can be achieved. For example, the measuring surface may be provided with a first cast-compatible mark such that the measuring surface simultaneously forms the first front face. Since the first front face can be adjusted in relation to the tool as a consequence, particularly rotated, the second front face with the second cast-compatible mark may be fixedly connected to the tool, without this compromising the adjustability of the first front face against the second front face.

It is also thinkable to arrange a mark comparable to the second cast-compatible mark directly on the tool. In this case, a second cast-compatible mark on the pressure sensor would not be absolutely necessary. However, it is more advantageous to arrange the second cast-compatible mark on the pressure sensor according to the invention, for example on a bushing, because the second cast-compatible mark can then be readily replaced, specifically without having to change the tool.

For the rest, the case of a mark comparable to the second cast-compatible mark being arranged directly on the tool shall be deemed a special case of the pressure sensor according to the invention, because this embodiment also belongs to the theory of this invention.

The invention also refers to a method for producing or retrofitting a metal or plastics processing tool. The method comprises the steps of creating or exposing a recess within the tool and installing a pressure sensor according to the invention in the recess within the tool.

The recess may specifically be a drilled hole.

The method provides the advantage of allowing simultaneous pressure measurement and date stamping, for example, even for tools with limited installation space. For example, limited installation space occurs if there is no space for two recesses or drilled holes in different places of the tool.

Further, tools are being used already having a date stamp, but no pressure measurement. With the help of the method according to the invention, the date stamp may be removed from the tool and be replaced by a pressure sensor according to the invention without remachining the tool being necessary. Remachining work such as the production of another drilled hole normally requires the tool to be removed from the injection molding machine. This may be avoided by using the method according to the invention, whereby the downtime of the injection molding machine is minimised.

The invention also refers to the use of a pressure sensor according to the invention when producing an injection-molded product.

As a consequence, the quality of the injection-molded product may be improved.

The detailed description below and the entirety of the claims result in additional advantageous embodiments and combinations of features of the invention.

BRIEF DESCRIPTION OF THE DRAWINGS

The drawings used in order to explain the embodiments show.

As a matter of principle, the same parts are identified with the same reference numerals in the figures.

DETAILED DESCRIPTION OF EXEMPLARY EMBODIMENTS OF THE INVENTION

Figure 1:
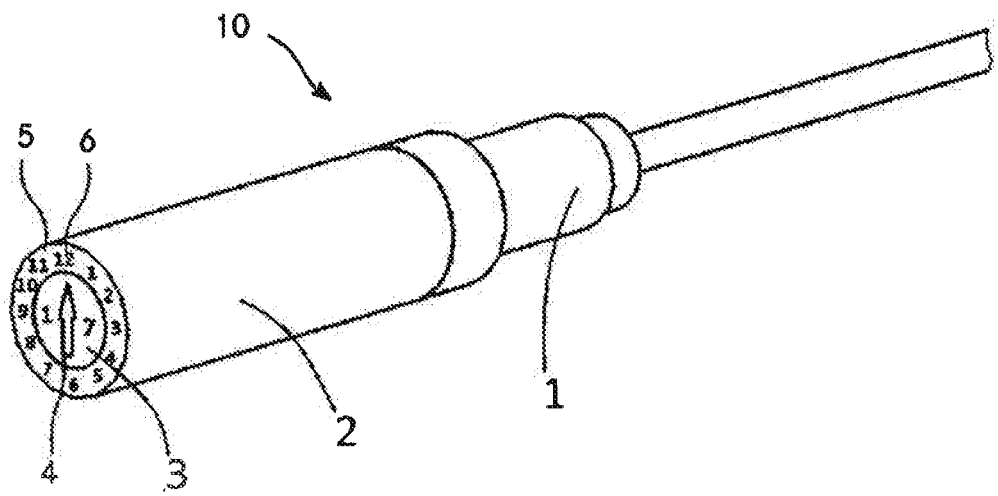
FIG. 1 a perspective representation of the pressure sensor according to the invention.

FIG. 1 shows a perspective representation of the pressure sensor 10 according to the invention. The pressure sensor 10 has a sensor housing 1 and a bushing 2. The left side of the pressure sensor 10 shown in FIG. 1 is the side pointing towards the pressure to be measured. The side pointing towards the pressure to be measured has a first front face 3 on which a first cast-compatible mark 4 is arranged. In this exemplary embodiment, the first cast-compatible mark 4 has an arrow-shaped groove and a year, specifically the last two digits thereof. For ease of representation, the numbers of the first cast-compatible mark 4 are not represented in a mirror-inverted manner. In a real pressure sensor 10, the first cast-compatible mark 4 is mirror-inverted so that the representation on the injection-molded product (not shown) is applied the right way around. On a second front face 5 arranged on the bushing 2, there is a second cast-compatible mark 6. In this exemplary embodiment, the numbers from one to twelve are applied as second cast-compatible mark 6, which corresponds to the twelve months, for example. Alike the first cast-compatible mark 4, the second cast-compatible mark 6 is not represented in a mirror-inverted manner for ease of representation. In a real pressure sensor 10, the second cast-compatible mark 6 is mirror-inverted so that the representation on the injection-molded product (not shown) is applied the right way around. The first front face 3 and the second front face 5 are substantially arranged in a common plane. By rotating the first front face 3 in relation to the second front face 5, the positions of the first cast-compatible mark 4 and the second cast-compatible mark 6 may be changed in relation to one another. The arrow of the first cast-compatible mark 4 may be brought to any desired direction by rotating the first front face, specifically to a direction causing the arrow to point to the number of the second cast-compatible mark 6 corresponding to the current month such as to the twelve. This way, a representation corresponding to the month of manufacture may be applied to the injection-molded product during injection molding. The first front face 3 may be rotated in relation to the second front face 5 with the help of an adjustment tool (not shown) such as with a screwdriver. In such an embodiment, the wedge-shaped tip (not shown) of the adjustment tool engages with the arrow-shaped groove of the first cast-compatible mark 4 and may cause an adjustment, specifically a rotation of the first front face 3 in relation to the second front face 5 by a rotary movement such that a desired representation can be created on the injection-molded product. Of course, it is possible to remove the first front face 3 from the pressure sensor 10 and replace it by another first front face 3, with the other first front face 3 being installed in the pressure sensor 10 instead of the removed first front face 3. For example, a first front face 3 with a first cast-compatible mark 4 with the final digits 1 and 7 as year may be replaced by another first front face 3 with a different first cast-compatible mark 4 with the final digits 1 and 8 as year. Removal of the first front face 3 and installation of the other first front face 3 are performed using suitable tools.

In the present embodiment, a commercially available conventional Kistler type 6182C pressure sensor was used. Due to its dimensions, i.e., its sensor housing 2, and its other technical data, this sensor type is suited particularly well for providing the pressure sensor according to the invention.

Figure 2:
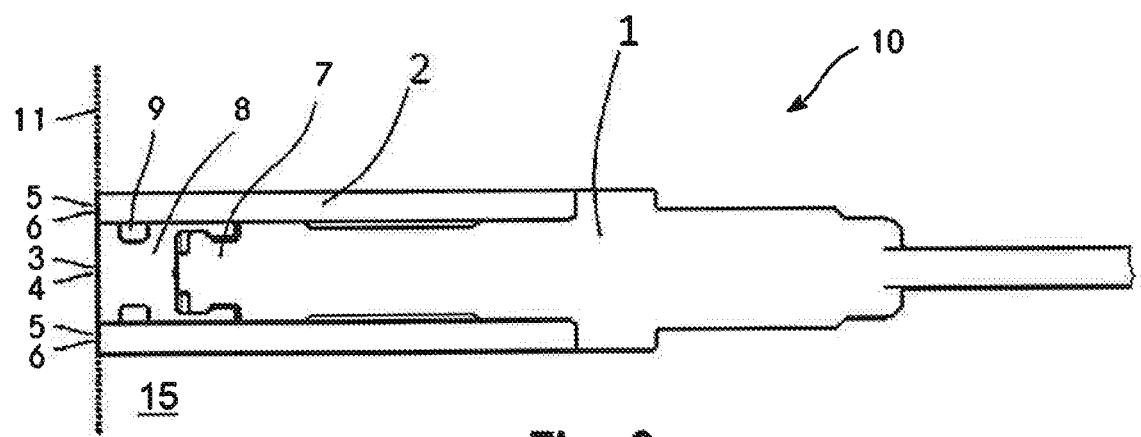
FIG. 2 a longitudinal section through a pressure sensor according to the invention.

FIG. 2 shows a longitudinal section through a pressure sensor 10 according to the invention. Within the sensor housing 1, a pressure transducer 7 is arranged. Between the pressure transducer 7 and the medium, the pressure of which is to be measured, there is an adjustment element 8. Thus, the first front face 3 corresponds to the surface area of the adjustment element 8 pointing towards the medium, the pressure of which is to be measured. The pressure transducer 7 and the adjustment element 8 are connected to one another in such a way that the pressure is transmitted from the adjustment element 8 to the pressure transducer 7, i.e., the adjustment element 8 and the pressure transducer 7 are operatively connected. FIG. 2 further shows a circumferential annular groove 9 within the adjustment element 8. This annular groove 9 may serve for supporting a seal (not shown). The bushing 2 with the second cast-compatible mark 6 arranged on the second front face 5 is in contact with the outer side of the sensor housing 1. Bushing 2 and sensor housing 1 are arranged concentrically. The first front face 3 and the second front face 5 are substantially arranged in a common plane 11. The adjustment element 8 is surrounded by the bushing 2, i.e., completely in a radial direction. The pressure sensor 10 according to the invention may be installed in a single drilled hole of a metal and plastics processing tool 15. The pressure sensor according to the invention may be installed in the tool 15 conventionally and its attachment thereto may also be conventional, as provided for the Kistler type 6182C sensor.

Figure 3:
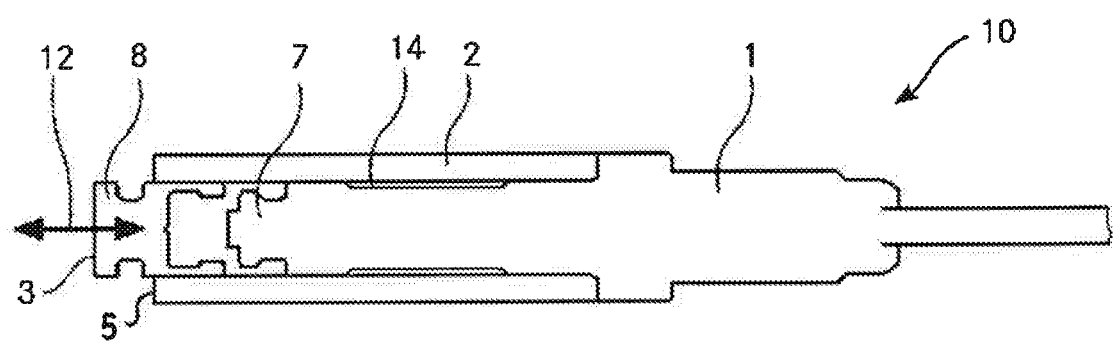
FIG. 3 a schematic representation of an embodiment of the pressure sensor according to the invention.
Figure 4:
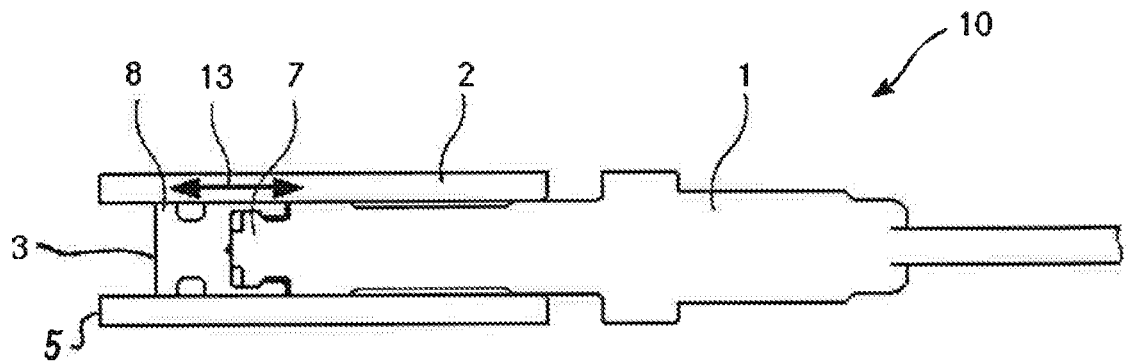
FIG. 4 a schematic representation of another embodiment of the pressure sensor according to the invention.

The FIGS. 3 and 4 schematically show two alternative embodiments of the pressure sensor 10 according to the invention. FIG. 3 shows an embodiment where the adjustment element 8 is arranged in the bushing 2 in an axially movable manner. The first double arrow 12 is intended to schematically represent the range of movement of the adjustment element 8 along a longitudinal axis in relation to the bushing 2. In practice, these movements are very small. Further, in practice, i.e., during normal operation of the pressure sensor 10 according to the invention, deviating from the representation in FIG. 3, the first front face 3 and the second front face 5 are substantially arranged in a common plane, and the adjustment element 8 and the pressure transducer 7 are in mechanical contact so that the pressure to be measured can be transmitted from the adjustment element 8 to the pressure transducer 7. The bushing 2 is fixedly connected to the sensor housing. For example, the bushing 2 may be screwed onto the sensor housing 1 using a thread 14. The adjustment element 8 or at least a part thereof is not only arranged within the bushing 2 in an axially movable manner, but also in a radially movable manner, so that a rotation of the first front face 3 around a common longitudinal axis 12 of sensor housing 1 and bushing 2 is possible. Between the adjustment element 8 and the sensor housing 1, snap-in noses (not shown) may be attached in order to hold the adjustment element 8 in predetermined positions in relation to the bushing 2.

FIG. 4 schematically shows a different embodiment where the bushing 2 is axially movable in relation to the sensor housing 1. This is indicated by the second double arrow 13. The adjustment element 8 is fixedly connected to the pressure transducer 7. As a consequence, the bushing 2 is also axially movable in relation to the adjustment element 8. In practice, these movements are very small. Further, in practice, i.e., during normal operation of the pressure sensor 10 according to the invention, deviating from the representation in FIG. 4, the first front face 3 and the second front face 5 are substantially arranged in a common plane.

In conclusion, it can be stated that there are a variety of different embodiments of the pressure sensor according to the invention. The pressure sensor according to the invention is very space-saving, because it only requires one recess in the tool 15 in order to be installed in a metal and plastics processing tool 15, but nevertheless provides two features, namely pressure measurement and date stamping.

Below, embodiments without adjustment element 8 will be mentioned additionally. In this case, the first cast-compatible mark may be located directly on the measuring surface, i.e., directly on the side of the pressure transducer pointing towards the pressure to be measured. For the first front face to be adjustable in relation to the second front face, the second front face may be arranged on a bushing surrounding the sensor housing completely in a radial direction and in certain areas in an axial direction, with the bushing being rotatable in relation to the sensor housing. For embodiments with predetermined positions of the first front face in relation to the second front face, snap-in devices may be provided between the bushing and the sensor housing, i.e., either on the end of the bushing opposite to the second front face or on the inner side of the bushing, for example at the level of the thread 14 shown in FIG. 3 that is not present in the herein discussed embodiments, however.

LIST OF REFERENCE NUMERALS

1 Sensor housing
2 Bushing
3 First front face
4 First cast-compatible mark
5 Second front face
6 Second cast-compatible mark
7 Pressure transducer
8 Adjustment element
9 Annular groove
10 Pressure sensor
11 Common plane
12 First double arrow
13 Second double arrow
14 Thread
15 Tool

What is claimed is:

1. Pressure sensor for a metal or plastics processing tool, comprising:
    a) a sensor housing, that can be connected to the tool;
    b) a pressure transducer arranged within the sensor housing;
    c) wherein the pressure sensor has a first front face with a first cast-compatible mark;
    d) wherein the pressure sensor additionally has a second front face with a second cast-compatible mark; and
    e) wherein the first front face and the second front face are adjustable against one another.

2. The pressure sensor according to claim 1, wherein the first front face is operatively connected to the pressure transducer.

3. The pressure sensor according to claim 1, wherein the second front face completely surrounds the first front face.

4. The pressure sensor according to claim 1, wherein the first front face and the second front face are substantially arranged in a common plane.

5. The pressure sensor according to claim 1, wherein the second front face with the second cast-compatible mark is arranged on a bushing.

6. The pressure sensor according to claim 5, wherein the bushing is in contact with the sensor housing.

7. The pressure sensor according to claim 6, wherein the bushing is fixedly connected to the sensor housing.

8. The pressure sensor according to claim 1, further comprising an adjustment element, wherein the first front face is arranged on the adjustment element such that the first front face is rotatable in relation to the sensor housing.

9. The pressure sensor according to claim 8, wherein the second front face with the second cast-compatible mark is arranged on a bushing and wherein the bushing is fixedly connected to the sensor housing; and wherein the bushing surrounds the adjustment element.

10. The pressure sensor according to claim 1, wherein the first front face is fixedly connected to the sensor housing.

11. Metal or plastics processing tool comprising a pressure sensor according to claim 1 installed into the tool.

12. The tool according to claim 11, wherein the sensor housing installed into the tool is adjustable in relation to the tool.

13. The tool according to claim 12, wherein the sensor housing installed into the tool is rotatable in relation to the tool.

14. Method for manufacturing or retrofitting a metal or plastics processing tool, comprising the steps of:
    a) creating or exposing a recess within the tool; and
    b) installing a pressure sensor according to claim 1 in the recess within the tool.

15. A method of manufacturing an injection-molded product in a mold, the method comprising the steps of:
    injecting molten precursor into the mold of an injection-molding tool that includes a pressure sensor according to claim 1; and
    using output from the sensor to optimize the manufacturing of an injection-molded product from the molten precursor injected into the mold.

\* \* \* \* \*